Jan. 31, 1956 R. K. ILER 2,733,160
SOLIDS COATED WITH ESTERSIL
Filed May 21, 1952
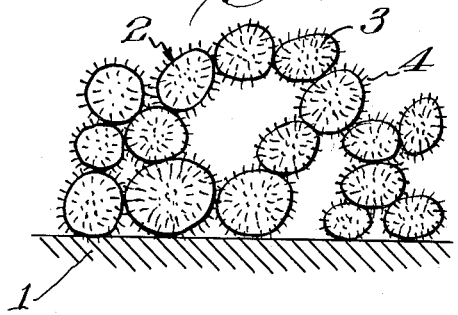
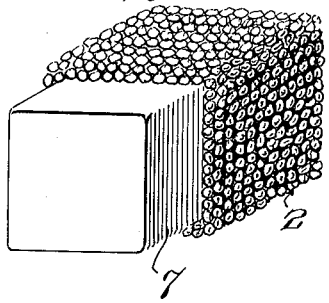
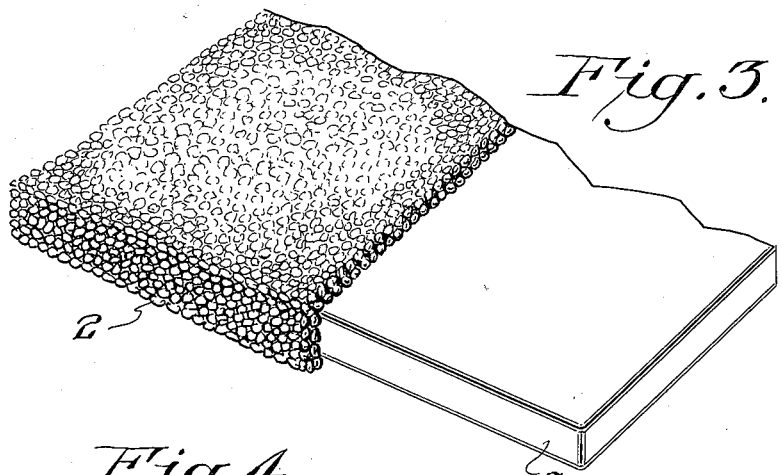
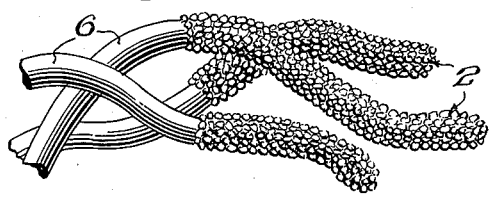
INVENTOR
Ralph K. Iler
BY Albert B. Griggs &
Fred C. Carlson
ATTORNEYS

# United States Patent Office 2,733,160
Patented Jan. 31, 1956

2,733,160

SOLIDS COATED WITH ESTERSIL

Ralph K. Iler, Brandywine Hundred, Del., assignor to E. I. du Pont de Nemours and Company, Wilmington, Del., a corporation of Delaware Application May 21, 1952, Serial No. 289,231

15 Claims. (Cl. 117—16)

This invention is directed to the modification of solids by coating their surfaces with an estersil.

This application is a continuation-in-part of my copending United States application, Serial No. 171,760, filed July 1, 1950, and now abandoned. In that application I have described certain compositions comprising estersils. The estersils are a novel class of surface-esterified, supercolloidal, particulate siliceous materials disclosed and claimed in my United States application, Serial No. 171,759, filed July 1, 1950, and now abandoned. More particularly, an estersil is an organophilic solid in a supercolloidal state of subdivision, having an internal structure of inorganic siliceous material with a specific surface area of at least 1 m.$^2$/g., having chemically bound to said internal structure —OR groups wherein R is a hydrocarbon radical, wherein the carbon atom attached to oxygen is also attached to at least 1 hydrogen, each —OR group having from 2 to 18 carbon atoms.

In the drawings:

Figure 1 shows a solid material, in section, having a continuous coating of estersil according to the invention, and Figure 2 is a detailed view greatly enlarged of a portion of Figure 1, and Figure 3 illustrates a sheet coated with an estersil according to the invention, part of the sheet being left uncoated for purposes of illustration, and Figure 4 illustrates an embodiment in which fibers are coated, again a portion of each fiber being left uncoated for purposes of illustration, and Figure 5 shows in perspective a particle of a finely divided powder coated according to the invention, a portion of the particle being left uncoated for purposes of illustration.

Describing the invention generally and referring to the drawings in somewhat greater detail, there is shown in Figure 1 a surface 1 which may be of any material solid at ordinary temperatures. It may be, for example, glass, cellulose, an organic plastic, or a metal. Further examples will be given hereafter.

Upon the surface 1 there is shown a continuous coating of an estersil. The coating is indicated generally at 2.

The coating 2 is illustrated in greater detail in Figure 2. In Figure 2 it will be seen that the coating is made up of silica particles 3 which are esterified upon their surfaces with ester groups 4. The estersils which make up the coating will be described further hereafter.

The coating of estersils may be applied as shown in Figure 3 to a sheet of material 5. This sheet may be cellophane, glass, polystyrene, or another organic polymeric plastic, or a sheet of a material such as rubber, paper, or a woven textile fabric such as cotton, wool, nylon or the like. The sheet has applied thereto a coating of estersil 2 and this may be applied to either one side or both. In the drawing the coating is shown as partly cut away so that the uncoated sheet may be seen.

In Figure 4 the base material is a fiber 6. The fibers may be either synthetic or natural fibers and may be, for example, glass, wool, cotton, nylon, asbestos, rayon, fur, and the like. The fibers 6 are shown in the figure as only partly coated for purposes of illustration and there will be seen a coating of estersil 2 upon the fibers. On the fibers the estersil coating markedly modifies the surface characteristics and, for example, when applied to wool or cotton it increases the friction between the fibers.

In Figure 5 there is illustrated a powder particle 7. Preferred compositions of the invention are powders such as metal powders, powders of graphite, woodflower, clays, or crystalline compounds.

In preferred compositions of the invention the powders are hygroscopic substances which normally tend to pick up water and to cake. Such materials, for example, are ammonium nitrate, ammonium sulfamate, calcium chloride, choline chloride, sodium sulfate, and the like.

As will be described hereinafter the powders may also be materials which while solid at normal temperatures tend to cake because of softening and surface coalescence. DDT, for instance, and various gums and resins can be modified and caused to form free-flowing powders according to the invention.

In each instance the finely divided material 7 is coated with an estersil coating 2.

Turning now to a more specific description of the invention the estersils used for coating solids will first be described.

The estersil

Estersils are described in detail together with methods for their preparation in my above mentioned application Serial No. 171,759. The disclosure of my prior case is herewith incorporated by reference since no need is seen to include here all of the specific illustrative materials and conditions of the prior application. Generally it can be said that estersils suitable for use according to the present invention can be prepared by esterifying an inorganic siliceous material having a specific surface area of at least 1 m.$^2$/g. with a primary or secondary alcohol in which the hydrocarbon radicals have from 2 to 18 carbon atoms. While the siliceous material which acts as a substrate for the estersil may vary widely in character it is preferred to use estersils in which the substrate has a specific surface area of at least 25 m.$^2$/g., and still better to use those in which the substrate has a specific surface area of at least 100 m.$^2$/g.

The substrate

The materials used to form the skeleton or internal structure, the substrate, of the estersils used according to the invention are solid, inorganic, siliceous materials.

The substrate materials can be mineral or synthetic in origin. They can be amorphous silica. They can be water insoluble metal silicates.

The substrate particles are aggregates of ultimate units; they have at least one dimension of at least 150 millimicrons. Thus they are in a supercolloidal state of subdivision. Preferably the substrate particles are coherent aggregates. That is, they are made up of tiny ultimate units which are so firmly attached to each other that they are not readily separated by simple stirring in a fluid medium. For the purposes of this invention, substrate particles in which the ultimate units have an average diameter of 10 to 100 millimicrons or ultimate units below 10 millimicrons diameter joined in very open networks (large pore size), are preferred. More specifically, it is preferred to use substrates in which the ultimate units have an average diameter below about 25 millimicrons.

Preferably, the inorganic siliceous solids used are porous. That is, they have exposed surfaces in the interior of the particle which are connected to the exterior so that liquids and gases can penetrate the pores and reach the exposed surfaces of the pore walls. In other words, the solid forms a three-dimensional network or webwork thru which the pores or voids or interstices extend as a labyrinth of passages or open spaces.

Especially preferred are porous inorganic siliceous solids having average pore diameters of at least four millimicrons.

The minerals which can be used as substrates include such things as chrysotile asbestos, kaolinite, and bentonites, such as, beidillite, saponite, and montmorillonite. There may also be used calcium silicate and other metal silicates.

A preferred substrate for the preparation of estersils for use according to the present invention is amorphous silica. Any of a wide variety of amorphous silica substrates may be used as described in my application above mentioned but it is preferred that they have a specific surface area above 100 m.$^2$/g. More specifically a preferred substrate is one which has a specific surface area from 200 to 900 m.$^2$/g., and an average pore diameter of a least 4 millimicrons.

The esterifying agents

Examples of compounds of this class are: Normal straight chain alcohols, such as ethyl, n-propyl, n-butyl, n-pentyl (amyl), n-hexyl, n-heptyl, n-octyl, n-nonyl, n-decyl, n-undecyl, n-dodecyl (lauryl), n-tetradecyl (myristyl), n-hexadecyl (cetyl) n-octadecyl (stearyl); branched chain primary alcohols such as isobutyl (2-methyl-1-propanol), isoamyl (3-methyl-1-butanol), 2,2,4, trimethyl hexane-1-ol and 5,7,7,trimethyl, 2(1,3,3-trimethyl butyl)octane-1-ol; secondary alcohols such as isopropyl, sec.-butyl (2-butanol), sec.-amyl (2-pentanol), sec.-n-octyl (methyl hexyl carbinol or 2-octanol), methyl isobutyl carbinol, and di-iso-propyl carbinol (2,4-dimethyl pentane-3-ol); alicyclic alcohols such as cyclopentanol, cyclohexanol, cycloheptanol (suberol), and menthol; alcohols having ethylenic unsaturations such as allyl (2-propane-1-ol), citronellol (3,7-dimethyl-6 (or 7) octen-1-ol), and geraniol (3,7-dimethyl-2,6-octadien-1-ol); compounds having acetylenic unsaturation such as propargyl alcohol (2-propyn-1-ol); and aromatic (araliphatic) alcohols such as benzyl (phenyl carbinol), beta-phenyl-ethyl (2-phenyl-ethanol), hydrocinnamyl (3-phenyl-1-propanol), alpha-methyl-benzyl (1-phenyl-ethanol), and cinnamyl (3-phenyl-2-propene-1-ol).

The saturated aliphatic primary and secondary alcohols are preferred. In other words, the preferred ester group is alkoxy.

The saturated primary aliphatic alcohols are especially preferred esterifying agents because they react more readily with the inorganic siliceous materials at lower temperatures than do the secondary alcohols and are more stable than the unsaturated alcohols at the temperature of the reaction.

It seems unnecessary to repeat here the extended discussion of suitable alcohols as given in my co-pending application. It will be mentioned, however, that as a practical matter the group of alcohols having from about 2 to 18 carbon atoms are preferred since they include the majority of commercially available monohydric alcohols. Alcohols containing from about 3 to 6 carbon atoms are especially preferred because they are economical and can readily be handled. Mixtures of the alcohols can, of course, be used.

Esterification

The preperation of substrates for esterification and the processes for esterification are shown in my afore-mentioned application and will not be described in any detail. It may be noted that the esterification is conducted with low water content and at elevated temperature.

The exent of the esterification will depend upon the specific reaction conditions, and materials. The estersils are organophilic whereas the substrates are not. Generally the preferred estersils will contain more than about 80 ester groups per 100 square millimicrons of surface of the internal structure or substrate. It is even preferable to use products which contain even larger numbers of ester groups, say 200 ester groups per 100 square millimicrons of substrate surface. The preferred estersils which are made with a substrate of amorphous silica having a specific surface area from about 200 to 900 m.$^2$/g. and an average pore diameter of at least 4 millimicrons, have at least 270 ester groups per 100 square millimicrons of substrate surface area.

For further details concerning the substrates which are suitable for use, the alcohols which may be employed for esterification, the reaction conditions, and the character of the products produced as well as various tests for characterizing the substrates and estersils, reference should be had to my previously mentioned application.

Applying estersils to solids

The estersils can be applied to solids in a variety of ways. The objective in each case is to provide upon the surface of the solid a thin coating of estersil.

Estersils in the form of pulverulent aggregates can be applied to films, sheets, and massive objects with vigorous rubbing or buffing.

Ordinarily the estersil should be broken down, if its particle size is not already small enough, so that the average particle size is no larger than about, say 10 microns. The particle size should be as small as possible for most uses and preferably when finely divided powers or fibers are treated the particle size should be at the most no more than about half the diameter of the particles or fibers being treated.

The estersil, if it is in the form of comparatively large aggregates, can be broken down by grinding prior to application to a solid substance, particularly to fibers and the like.

If the estersil is to be applied to a powder the application can often be effected by grinding the powder together with the pulverulent estersil and continuing the grinding until the particle size is such that the powder is coated with estersil.

Instead of applying the estersils in a dry condition as described they can first be milled with organic liquids in order to obtain the desired degree of breakdown of particle size. One can use, for example, such organic liquids as acetone, butanol, isopropanol, and methyl ethyl ketone. The solvent should be such as will evaporate and leave the system. The suspension can be applied to sheets, fibers, or finely divided materials. The suspensions can also be applied to sheets and massive objects by buffing, or to fibers or powders with rubbing and grinding.

It will be understood that the amount of an estersil used can vary widely, depending upon the specific solid material to be coated and depending upon the magnitude of the effect desired. Generally, it is desirable to apply as thin a film as possible though no great disadvantage attends the use of excess material. The coating need not be continuous for many purposes since it will often be sufficient to have patches or spots coated with estersil.

Similarly the amount of estersils to use with finely divided powders can be varied widely and excesses can be present without great disadvantage for most uses. Generally from about one half to 25 per cent by weight of a composition consisting of a solid finely divided material and estersil can advantageously be composed of estersil. Much smaller amounts can be used.

The solids to which estersils are applied

Surface coatings of estersils can be applied, according to the invention, to any material which is solid at normal temperatures. Such coatings can be applied, for example, to massive objects such as walls, furniture, floors, statuary, bricks, and molds such as those used in casting. The massive object is represented in Figure 1 by the reference numeral 1. The coating is represented by 2, and this has been described above.

Temporary water-repellent effects on ceramic products, particularly unglazed ceramic bodies, can be obtained by rubbing dry estersil powders into the surface, or by the application of a dispersion of estersil in alcohol, for example, to the glazed surface. Such water-repellent areas provide patterns on the surface to which aqueous glazes will not adhere, yet after firing, are fully receptive to additional glaze coatings. Colored as well as clear glazes may, of course, be used.

Estersils are also useful in the rubber industry for their anti-sticking effect. For example, when applied as a dilute suspension to the interior of rubber molds, estersils act as mold release agents, in this way being superior to talc which is conventionally used. Soaps and particularly non-ionic detergents can be utilized along with the estersils in such mold lubricant compositions.

Estersils can be incorporated into cleaners and polishes for metals, such as conventional silver polishes, chrome finish cleaners, and rust removers. The estersils act as dispersing agents for the cleaner abrasives, such as diatomaceous earth, volcanic ash, finely divided aluminum oxides, carborundum, titanium dioxide, and iron oxide. The estersils also disperse oils in oil-water emulsion type cleaners.

Estersils can be added to organic solvent type metal cleaning baths to act as dirt and oxide dispersing agents, keeping the dirt from redepositing upon the metal. The estersils also can then be left as a thin film on the metal after cleaning, to act as a lubricant, particularly for metal sheets.

The estersil coatings applied to articles according to the invention can serve as bonding agents. They can, for example, act as bonding agents between ceramic bodies and metals. For instance, cleaned steel sheet can be coated with a thin layer of estersil, heated, and thereafter a coating of enamel frit can be applied and the composition fired under reducing conditions to provide an enamel coating on steel.

The invention is also advantageously applicable to the coating of sheets and films. Such a structure is illustrated in Figure 3 at 5. The surface coating again is shown at 2. The sheet may be made of paper or other cellulosic materials. It may be a plastic sheeting or film such as those made of cellophane, polyethylene, polyvinyl chloride, chlorinated rubbers, polyvinylidene chloride, natural rubber, neoprene, GRS, and silicone rubbers. The sheets may be woven or formed structures such as cloth of any natural or artificial fibers.

Estersils can be applied to the surface of uncured rubber stocks, such as camelback, being more effective per pound than dusts such as talc. The estersils can be applied to a variety of sheets or other surfaces which though solid at ordinary temperatures are tacky. They can be used to reduce the tackiness of the surface of plastic films and they can be dusted on plastic-coated fabrics, rubber articles and even freshly painted or lacquered objects which have some tendency to stick to one another or to packing materials.

Estersils can be applied as a dry coating to paper or cloth, rendering these materials suitable as a substitute for Holland cloth in the rubber industry.

The estersils can be dispersed in a liquid medium and applied to films or sheets, either in a dilute or concentrated form, according to methods with which the art is already familiar. For example, the estersils can simply be dusted on paper and calendered into the surface or rubbed in by brushes. As suggested hereinabove the estersils can be applied in a liquid medium with or without rubbing.

Estersils may be applied with advantage to films made of water-soluble or water-sensitive substances such as gelatin, polyvinyl alcohol, carboxymethyl cellulose and methyl cellulose.

The invention can also be used to advantage in coating fibres as illustrated in Figure 4 where a typical fiber is shown at 6. The fibers can be treated as has been suggested above after they are formed into woven or felted products. The estersils may however be applied with advantage to yarn or to the thread or to the fiber before it is formed into a thread.

Estersils can be applied to fibers such as rayon, nylon, polyester fibers, polyacrylonitrile, and other synthetic fibers. They may also be applied to natural fibers such as wool, cotton, silk, ramie, hemp, alpaca, camelhair, fur, feathers, goathair, horsehair, and animal bristles generally.

The estersils can be applied at various stages in the manufacture of articles from fibers and they may be applied to the fibers by the application of dust or liquid dispersions before processing. The estersils can be applied to the surface of fibers immediately after spinning, either in the form of a suspension in a liquid or as a dry dust. It is often preferable to incorporate an estersil in a volatile liquid medium applied during spinning and weaving. This is particularly the case with glass fibers where the particles of estersil provide a protective and lubricating action on the individual glass fibrils.

The invention can also be applied to the coating of powders as is illustrated in Figure 5. In Figure 5 there is illustrated a solid particle 7 which may be of any substance and may, for example, be an ammonium nitrate crystal. Other hygroscopic materials may similarly be coated according to the invention with great advantage. There may be used, for example, calcium chloride, ammonium sulfamate, choline chloride, magnesium sulfate, sodium sulfate, tetramethylammonium chloride, and other hygroscopic substances.

The invention can also be applied to advantage for the treatment of materials which are gummy or tend to coalesce and not to flow as freely as they might, especially after storage. For example, an estersil can be applied to the surface of solidified nitroglycerine-nitrocellulose gels and powders and to insecticide compositions such as finely divided DDT, methoxychlor, and benzenehexachloride. This can be done by grinding the product with an estersil while chilling, as with Dry Ice.

Pesticide products are improved in many ways by the incorporation of estersils. An excellent application of estersils is exemplified by their use as diluents and extenders and anti-caking agents for insecticides such as methoxychlor and DDT. The estersils may form the large proportion of the insecticide product, serving as a carrier for minor quantities of the insecticidal agent, or they may be used in smaller proportions functioning as anti-caking agents for finely pulverized insecticide products such as DDT. They can be used either alone or along with very cheap extenders such as low density clays, diatomaceous earth, or wood flour.

Another application of estersils in the preparation of pesticide products is as dispersing agents in oil-water type insecticide emulsions. Estersils can be used for converting finely divided hydrophobic insecticides to a condition such that they are self-dispersible in water. For example, DDT can be pulverized with partially esterified estersils, using sufficient estersil to provide a very thin coating on the surface of DDT particles, this dry powder can then be dispersed directly in water.

Estersils can also be applied to finely divided gums, resins, and waxes, ranging from high melting to relatively low melting products. For example, a commercial wax such as carnauba wax, which may or may not be modified by the addition of small amounts of shellac or another resin may be finely divided by micropulverizing at low temperature and then the particles coated with an estersil according to the present invention.

Estersils can be mixed with one or a combination of dry lubricants, e. g., graphite, molybdenum sulfide, talc, powdered mica, etc. Such mixtures have less tendency to aggregate and hence have better and more uniform covering power. Compositions of this type can be used for lubricating the surface of metals during forming operations, including rolling, stamping, drawing, and die casting. The lubricant composition can be applied to the metal prior to the forming operation or applied to the surface of the forming equipment. It can be applied to the inner surface of molds into which metals are cast.

As has previously been suggested the estersils can be used for coating finely divided materials such as diatomaceous earth, volcanic ash, finely divided aluminum oxides, carborundum, titanium dioxide, and iron oxide.

The estersils can be applied to finely divided ore particles such as dolomite, calcite, rutile, corundum, serpentine, chrysotile, bentonite, attapulgite and kaolin.

Illustrative of the finely divided metal powders which can be used, there may be mentioned cobalt, nickel, copper, iron, tungsten, and other metals which are customarily handled as powders, and alloys and mixtures of such metals.

Finely divided metal oxides to be used as refractories can be coated with estersils.

Powdered metals are improved by incorporation of estersils. The estersils can be mixed with the powdered metals to form a thin lubricating coating on the metal particles, improving the flow into the molds prior to compression.

Porous metal products can be made by coating estersils on powdered metals, compressing the mixture and subsequently leaching out the estersil with alkali. This can be done in the case of metals which are resistant to alkali, such as iron, copper, nickel, and chromium, gold, silver, and platinum. The estersils are particularly advantageous for the preparation of metal catalysts, involving those metals which are readily reduced, since the metal oxides can be mixed with the estersils and then the composition can be heated in an inert atmosphere to cause the ester groups to act as a reducing agent on the metal oxide.

Soap powders and finely divided detergent compositions can be coated with estersils and there will be a reduction in the tendency of the products toward caking.

In addition to the finely divided powders already mentioned, it will be evident that estersils can advantageously be applied to a wide variety of finely divided materials. They can be used as anti-caking agents in explosives using ammonium nitrate. They may be used also in cosmetic preparations such as face powder.

The estersils may be applied to carbon particles such as carbon blacks. The particles of carbon black are so small that the estersils should be of the smallest particle size. For example, they should after application have a particle size of less than about twenty millimicrons and the coating can be applied to the carbon black by continued attrition of the mixture. The ultimate particles in an amorphous silica aggregate to be applied to carbon black will ordinarily have an average diameter of less than about ten millimicrons.

Fillers for organic plastics and other organic systems may be very advantageously coated with estersils according to the invention, since they are thus rendered organophilic and aggregation in the plastic or other organic system is minimized. Thus, wood flour, walnut shell flour, diatomaceous earth, carbon black, clay, calcium carbonate, and finely divided hydrophilic silica can be coated to make fillers suitable for incorporation in plastics such as polyethylene, Bakelite, polystyrene, or any of the other numerous plastic materials known to the art. Such materials may also be included in natural rubber, in any of the various synthetic rubbers, such as GRS and neoprene. They may also be used in silicone rubbers.

I claim:

1. A solid modified with a surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radial of from 2 to 18 carbon atoms wherein the carbon atom attached to oxygen is also attached to hydrogen.

2. A solid modified with a continuous surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

3. A solid modified with a continuous surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 25 to 900 square meters per gram, the coating of —OR groups being chemically bound to said silica, R being a hydrocarbon radical of from 2 to 18 carbon atoms wherein the carbon atom attached to oxygen is also attached to hydrogen.

4. A sheet of a solid material modified with a surface coating of an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

5. A sheet of a solid material modified with a continuous surface coating of an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

6. A sheet of a solid material modified with a continuous surface coating of an estersil which is organophilic, being preferentially wetted by butanol in a butanol-water mixture, the estersil comprising a supercolloidal substrate coated with —OR groups, the substrate having a surface of silica and having a specific surface area of from 25 to 900 square meters per gram, the coating of —OR groups being chemically bound to said silica, R being a hydrocarbon radical of from 2 to 18 carbon atoms wherein the carbon atom attached to oxygen is also attached to hydrogen.

7. A solid fiber modified with a surface coating of an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

8. A solid fiber modified with a continuous surface coating of an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

9. A solid fiber modified with a continuous surface coating of an estersil which is organophilic, being preferentially wetted by butanol in a butanol-water mixture, the estersil comprising a supercolloidal substrate coated with —OR groups, the substrate having a surface of silica and having a specific surface area of from 25 to 900 square meters per gram, the coating of —OR groups being chemically bound to said silica, R being a hydrocarbon radical of from 2 to 18 carbon atoms wherein the carbon atom attached to oxygen is also attached to hydrogen.

10. A finely divided solid powder modified with a surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

11. A finely divided solid powder modified with a continuous surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

12. A finely divided solid powder modified with a continuous surface coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 25 to 900 square meters per gram, the coating of —OR groups being chemically bound to said silica, R being a hydrocarbon radical of from 2 to 18 carbon atoms wherein the carbon atom attached to oxygen is also attached to hydrogen.

13. A solid powder having an average particle size less than about 100 microns coated with another solid which is an estersil which is organophilic, being preferentially wetted by butanol in a butanol-water mixture, the estersil comprising a supercolloidal substrate coated with —OR groups, the substrate having a surface of silica and having a specific surface area of from 100 to 900 square meters per gram and an ultimate particle size less than 25 millimicrons, the coating of —OR groups being chemically bound to said silica, R being a hydrocarbon radical of from 2 to 18 carbon atoms wherein the carbon atom attached to oxygen is also attached to hydrogen, the composition containing from about one half to 25% by weight of the estersil based upon the total weight of the composition.

14. A hygroscopic solid powder coated with a continuous coating of another solid which is an estersil which is organophilic, being preferentially wetter by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

15. A hygroscopic solid having an average particle size less than about 100 microns coated with a continuous coating of another solid which is an estersil which is organophilic, being preferentially wetted by butanol in a butanol-water mixture, the estersil comprising a supercolloidal substrate coated with —OR groups, the substrate having a surface of silica and having a specific surface area of from 100 to 900 square meters per gram and an ultimate particle size less than 25 millimicrons, the coating of —OR groups being chemically bound to said silica, R being a hydrocarbon radical of from 2 to 18 carbon atoms wherein the carbon atom attached to oxygen is also attached to hydrogen, the composition containing from about one half to 25 per cent by weight of the estersil based upon the total weight of the composition.

References Cited in the file of this patent

UNITED STATES PATENTS

| Number | Name | Date |
|---|---|---|
| 2,372,285 | Mare et al. | Mar. 27, 1945 |
| 2,408,656 | Kirk | Oct. 1, 1946 |
| 2,527,329 | Powers et al. | Oct. 24, 1950 |
| 2,531,945 | Moulton | Nov. 28, 1950 |
| 2,657,149 | Iler | Oct. 27, 1953 |